United States Patent [19]

Gibson

[11] 4,441,845
[45] Apr. 10, 1984

[54] BALE HANDLING APPARATUS

[76] Inventor: David W. Gibson, P.O. Box 117, Springdale, Mont. 59082

[21] Appl. No.: 474,256

[22] Filed: Mar. 10, 1983

Related U.S. Application Data

[63] Continuation-in-part of Ser. No. 287,285, Jul. 27, 1981, Pat. No. 4,376,607.

[51] Int. Cl.³ .......................................... A01D 87/12
[52] U.S. Cl. ................... 414/24.6; 414/111; 414/501
[58] Field of Search ............... 414/24.5, 24.6, 111, 414/518, 911, 501, 502

[56] References Cited

U.S. PATENT DOCUMENTS

| | | | |
|---|---|---|---|
| 3,874,609 | 4/1975 | Larson | 414/24.6 |
| 3,924,765 | 12/1975 | Hostetler | 414/24.5 |
| 3,942,666 | 3/1976 | Pfremmer | 414/24.5 X |
| 4,068,804 | 1/1978 | Butler et al. | 241/101.7 |
| 4,101,081 | 7/1978 | Ritter et al. | 414/502 X |
| 4,261,676 | 4/1981 | Balling | 414/24.5 |
| 4,376,607 | 3/1983 | Gibson | 414/24.6 |

FOREIGN PATENT DOCUMENTS 2048211 12/1980 United Kingdom ............... 414/24.6

*Primary Examiner*—Leslie J. Paperner
*Attorney, Agent, or Firm*—Arthur L. Urban

[57] ABSTRACT

Bale handling apparatus including a base portion, a bale storing portion, a bale moving portion, a bale distributing portion and a control portion; the base portion including a frame section, wheeled carriage supporting the frame section, a hitch member disposed at one end of the frame section; the bale storing portion including a bale supporting section disposed on the frame section, the bale supporting section extending from the rear end of the frame section remote from the hitch member toward but spaced from the hitch member, side rail sections extending upwardly from longitudinal edges of the bale supporting section; the bale moving portion including a transverse rear rail section disposed between the side rail sections, the rear rail section being movable from the rear end of the bale supporting section to the front end thereof; the bale distributing portion being disposed on the frame section between the hitch member and the bale storing portion, the bale distributing portion including a frame, bale rotating mechanism mounted on the frame, the bale rotating mechanism being oriented transversely of the bale storing portion; the control portion including mechanism for moving the rear rail section toward the bale distributing portion, and mechanism for driving the bale rotating mechanism.

17 Claims, 4 Drawing Figures

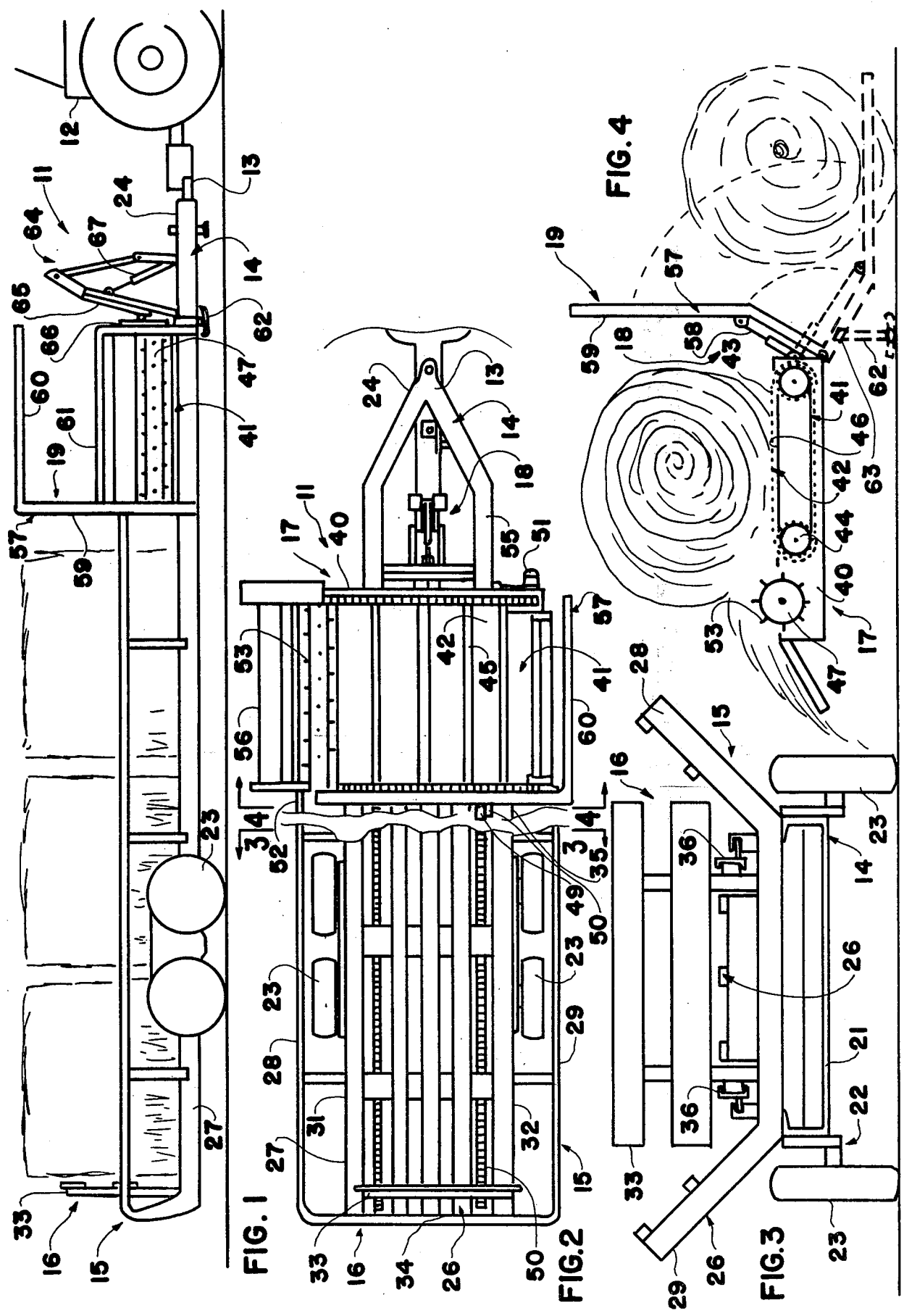

4,441,845

BALE HANDLING APPARATUS

This application is a continuation-in-part of pending application Ser. No. 287,285, filed July 27, 1981, now U.S. Pat. No. 4,376,607.

This invention relates to a novel bale handling apparatus and more particularly relates to a new apparatus for handling large bales of forage material.

Many years ago, cut hay and other forage crops were gathered into stacks for storage prior to use as animal feed. While this method was satisfactory when farm labor was readily available and cheap, difficulties in obtaining farm laborers and the high cost of such labor have seen the demise of loose haystacks in recent years.

A variety of solutions have been proposed for reducing the amount of labor required for gathering and storing hay. These proposals frequently have involved the mechanical compression of hay into bales of one shape or another. The use of this type of machinery for baling hay has resulted in a significant reduction in the hand labor previously required for such operations.

Hay often is baled into rectangular bales having a size of about one foot by one and one-half feet by three feet. These bales then are stacked in crossed layers with the bales in one layer having their long dimension at right angles to the long dimension of bales in adjacent layers. Although machinery has been developed to stack rectangular bales, most farmers and ranchers still utilize considerable hand labor with such small bales to achieve the desired tight straight stacking of the bales.

With the continually increasing difficulties in obtaining and paying for farm labor, there have been further efforts to develop hay handling methods that can achieve additional reductions in the amount of hand labor required for such operations. One proposal that has received a considerable degree of accpetance has been the baling of hay into large round bales. These bales may be as large as six feet or more in diameter and weigh more than 1,000 pounds.

Round bales have a number of significant advantages over conventional small rectangular bales. Round bales can be gathered from the field and stacked easily by one person with a tractor. A tractor can be equipped with a spear-like projection or a fork lift attachment and the bale lifted off the ground and moved to a desired position. Since a half ton or more of hay can be handled in one simple operation, a large quantity of hay can be gathered and stacked in a very short time by a single tractor operator.

While methods such as described above have been developed which greatly reduce the amount of hand labor involved in gathering and storing hay, the subsequent use and feeding of such hay still often involves considerable hand labor. Usually with small rectangular bales, the bales are removed from the stack individually by hand and transferred to the feeding site in a truck or trailer. At the feeding site, each bale is opened by cutting the twine and the hay distributed over the ground.

In feeding animals from the large round bales, the hay may be distributed from the bale by hand or by one of the presently offered tractor accessories. Feeding by hand involves carrying a bale to the field with a tractor, stopping the tractor periodically and getting off to remove and distribute some of the hay by hand.

The commercially available mechanical round bale feeders ordinarily require that the bales be handled one at a time. After a bale has been distributed in the field, the driver must return to the hay storage area, pick up another bale and then drive back to the field to resume the distributing operation. This repeated returning to the hay storage area can waste considerable time and fuel.

The present invention provides a novel bale handling apparatus which simplifies the distribution of hay and other forage from large round bales. The bale handling apparatus of the invention provides a convenient means for achieving uniform distribution of hay quickly and with a minimum of time and fuel. The bale handling apparatus permits a single person driving a tractor to distribute hay from a large number of bales in a short period of time. Also, bales may be loaded and unloaded automatically.

The bale handling apparatus of the present invention is simple in design and relatively inexpensive to manufacture. The bale handling apparatus can be fabricated from commercially available materials and components. Conventional farm equipment manufacturing techniques and procedures can be utilized in the fabrication of the apparatus.

The bale handling apparatus is suitable for use under a wide variety of conditions. The apparatus can be installed on a tractor easily in only a few minutes and can be removed as easily when not needed. The apparatus is durable in construction and has a long useful life with little maintenance.

Other benefits and advantages of the novel bale handling apparatus of the present invention will be apparent from the following description and the accompanying drawings in which:

FIG. 1 is a side elevation of one form of the bale handling apparatus of the invention attached to a tractor;

FIG. 2 is a top view of the bale handling apparatus shown in FIG. 1;

FIG. 3 is a sectional view of the bale handling apparatus shown in FIGS. 1 and 2 taken along line 3—3 of FIG. 2; and FIG. 4 is a sectional view of the bale handling apparatus shown in FIGS. 1 and 2 taken along line 4—4 of FIG. 2.

As shown in the drawings, one form of the novel bale handling apparatus 11 of the present invention is attached to a tractor 12 through a hitch member 13. The bale handling apparatus 11 includes a base portion 14, a bale storing portion 15, a bale moving portion 16, a bale distributing portion 17 and a control portion 18. Advantageously, the apparatus 11 also includes a bale loading portion 19.

The base portion 14 of the bale handling apparatus 11 of the invention includes a frame section 21. The frame section 21 is supported on carriage means 22 that includes wheels 23. Hitch member 13 is disposed at one end 24 of the frame section 21.

The bale storing portion 15 of the bale handling apparatus 11 includes a bale supporting section 26. The bale supporting section 26 is disposed on the frame section 21. The bale supporting section 26 extends from the rear end 27 of the frame section 21 that is remote from the hitch member 13.

The bale supporting section extends toward the opposite end 24 of the frame section but is spaced from the hitch member 13. The base supporting section advantageously extends significantly more than one-half the length of the apparatus 11.

The bale supporting portion 15 also includes side rail sections 28 and 29. The side rail sections 28 and 29 extend upwardly from the longitudinal edges 31 and 32 of the bale supporting section 26. The side rail sections 28 and 29 preferably extend upwardly and outwardly from the supporting section 26. As shown, the side rail sections are angled upwardly from the longitudinal edges 31 and 32.

The bale moving portion 16 of the apparatus 11 includes a transverse rear rail section 33. The rear rail section 33 is disposed between the side rail sections 28 and 29. The rear rail section 33 is movable from the rear end 34 of the bale supporting section 26 to the front end 35 thereof.

The rear rail section 33 advantageously is movable along longitudinal guide means shown as channels 36 which are disposed longitudinally of the bale supporting sections and below the surface thereof.

The bale distributing portion 17 of the bale handling apparatus 11 is disposed on the frame section 21 between the bale storing portion 15 and the hitch member 13. The bale distributing portion 17 includes a frame 40 and bale rotating means 41 mounted on the frame. The bale rotating means 41 is oriented transversely of the bale storing portion 15.

The bale rotating means 41 advantageously includes conveying means 42. Conveying means 42 preferably includes endless chains 43 mounted on sprockets 44. Extending between the chains 43 are angle members 45 which pass above and below supporting surface 46.

The bale rotating means advantageously also includes roller means 47. Preferably, the roller 47 is disposed adjacent one longitudinal edge 52 of the frame section 21. Advantageously, the roller 47 includes a plurality of fingers 53 on the peripheral surface thereof.

The control portion 18 of the apparatus 11 includes means for moving the rear rail section 33 toward the bale distributing portion 17. As shown, this may include hydraulic drive means such as motor 48 driving a sprocket 49 that moves a chain 50. Rear rail section 33 is attached to the chain.

The control portion 18 also includes means for driving the bale rotating means 41. This may include a second hydraulic motor 51 that is operatively connected to sprocket 44 and to roller 47.

The bale handling apparatus 11 of the present invention advantageously includes a bale loading portion 19. The bale loading portion 19 preferably is disposed adjacent to the bale distributing portion 17. Advantageously, the bale loading portion is disposed adjacent the longitudinal edge 55 of the frame section 21 opposite to the discharge 56 of the bale rotating means 41.

The bale loading portion 19 further includes a fork member 57. The fork member 57 preferably is pivotally connected to the longitudinal edge 55 of the frame section. The control portion 18 also advantageously includes hydraulic cylinder means 58 for pivoting the fork member 57. The fork member 57 includes a transverse member 59 with a pair of spaced cross members 60 and 61 extending substantially perpendicular therefrom.

The bale loading portion 19 further preferably includes retractable supporting foot means 62. The foot 62 advantageously is operatively connected to the pivotal bale support fork 57 through a suitable linkage 63.

The bale handling apparatus 11 preferably further includes bale ram means 64. The bale ram 64 advantageously is disposed adjacent the bale loading portion 19 and preferably along the forward edge of said bale distributing portion 17. The bale ram 64 advantageously includes a pivotally connected arm member 65. The arm member 65 includes a bale contact section 66 adjacent the free end thereof. The contact section 66 of the arm member preferably is movable toward the rear rail section 33. The control portion 18 advantageously includes a hydraulic cylinder 67 to move the arm member 65.

In the use of the bale handling apparatus 11 of the present invention as shown in the drawings, the apparatus first is attached to a tractor 12 through hitch member 13. The tractor then is driven to an area containing hay such as a field with hay bales or a storage area.

The hay bales may be loaded onto the apparatus 11 by any conventional bale loading equipment (not shown) or more preferably through the use of the bale loading portion 19. To load the bales with the loading portion 19, the hydraulic cylinders 58 are activated lowering the fork member 57 into contact with the ground alongside the apparatus. As the fork member 57 is lowered, the supporting foot 62 operatively connected thereto through linkage 63 automatically is extended.

The tractor 12 then is driven into a position alongside a bale so the cross members 60 and 61 of the fork member 57 are located on each side of the bale. The hydraulic cylinders 58 then are activated again, raising the fork member 57 with the bale positioned thereon upwardly until the bale falls onto the bale distributing portion 17.

The bale loaded onto the bale distributing portion 17 is pushed to the rear of the bale supporting section 26 by actuating hydraulic cylinder 67 causing arm member 65 to push the bale along the supporting section 26 to the rear of the apparatus 11. This loading and pushing sequence is repeated for additional bales until the apparatus is full. Bales fill the entire bale supporting section 26 with an extra bale on the bale distributing portion 17.

To distribute the hay, the apparatus 11 with the hay thereon is drawn to a feeding area. Then, hydraulic motor 51 is actuated advancing conveyor 42 and rotating roller 43. This action causes the bale on the distributing portion 17 to rotate. During this rotation, the outer layer of the hay bale contacts roller 43.

The fingers 47 of the roller separate a ribbon of hay from the bale and transfer it to the ground alongside the apparatus continuously. While this distribution is occurring, the tractor 12 can be driven forward to distribute the ribbon along the path of the apparatus.

When the distribution of the first bale is complete, hydraulic motor 48 is activated driving sprocket 49 and chain 50 and drawing rear rail section 33 forward toward the bale distributing portion 17. This action causes the forward-most bale to be pushed back onto the bale distributing portion 17. The motor 51 is activated again to unwind the bale and distribute a ribbon of hay on the ground next to the apparatus.

The sequence of advancing each bale onto the bale distributing portion and unwinding it onto the ground is repeated until all of the bales have been fed. The tractor 12 drawing the empty apparatus 11 then is driven back to the hay collecting area and a new group of bales is loaded onto the apparatus.

The bale handling apparatus 11 of the invention also can function as a hay carrier. The unloading operation can be accomplished by reversing the loading operation at the unloading area. The bale on the bale distributing portion 17 is pushed back onto the fork member 57 by reversing the direction of the conveyor 42 as the bale support fork member 57 is lowered to the ground and the apparatus moved backward freeing the bale. In the same way, successive bales are moved onto the bale distributing portion 17, the conveyor reversed, the fork member 57 lowered to the ground and the apparatus backed away to free the bale.

The above description and the accompanying drawings show that the present invention provides a novel bale handling apparatus which simplifies the loading, transfer, distribution and/or unloading of forage material in the form of large round bales. The apparatus of the invention enables one person driving a tractor or other vehicle to handle a large number of bales in a short period of time automatically from the driver's seat. The apparatus provides a novel means for distributing hay or other forage material with a minimum of time and fuel. Also, the apparatus can be used for collecting, transferring and storage bales without any hand labor.

The bale handling apparatus of the present invention is adaptable for use under a variety of different conditions. The apparatus can be installed on a tractor in only a few minutes and can be removed as easily when the apparatus is not needed.

The bale handling apparatus is simple in design and relatively inexpensive to manufacture. The apparatus is durable in construction and has a long useful life with little maintenance. The bale handling apparatus can be fabricated from commercially available materials and component using conventional farm equipment manufacturing techniques and procedures.

It will be apparent that various modifications can be made in the particular bale handling apparatus described in detail and shown in the drawings within the scope of the invention. The size, configuration and arrangement of components can be changed to meet specific requirements. Also, the control portion can be different to facilitate operation of the apparatus with particular vehicles. These and other changes can be made in the bale handling apparatus of the invention provided the functioning and operation of the apparatus are not deleteriously affected. Therefore, the scope of the invention is to be limited only by the following claims.

What is claimed is:

1. Bale handling apparatus including a base portion, a bale storing portion, a bale moving portion, a bale distributing portion, a bale loading portion and a control portion; said base portion including a frame section, wheeled carriage means supporting said frame section, a hitch member disposed at one end of said frame section; said bale storing portion including a bale supporting section disposed on said frame section, said bale supporting section extending from the rear end of said frame section remote from said hitch member toward but spaced from said hitch member, side rail sections extending upwardly from longitudinal edges of said bale supporting section; said bale moving portion including a transverse rear rail section disposed between said side rail sections, said rear rail section being movable from the rear end of said bale supporting section to the front end thereof; said bale distributing portion being disposed on said frame section between said hitch member and said bale storing portion, said bale distributing portion including a frame, bale rotating means mounted on said frame, said bale rotating means being oriented transversely of said bale storing portion; said bale loading portion being disposed adjacent to said bale distributing portion for loading a bale onto said bale distributing portion; said control portion including means for moving said rear rail section toward said bale distributing portion, and means for driving said bale rotating means; whereby bales positioned on said bale storing portion are advanced sequentially to said bale distributing portion and material distributed therefrom.

2. Bale handling apparatus according to claim 1 wherein said longitudinal rail sections extend upwardly and outwardly from said bale supporting section.

3. Bale handling apparatus according to claim 1 wherein said rear rail section is movable along longitudinal guide means disposed below said bale supporting section.

4. Bale handling apparatus according to claim 1 wherein said bale rotating means of said bale distributing portion includes conveying means.

5. Bale handling apparatus according to claim 1 wherein said bale rotating means of said bale distributing portion includes roller means.

6. Bale handling apparatus according to claim 5 wherein said roller means is disposed adjacent one longitudinal edge of said frame section.

7. Bale handling apparatus according to claim 1 wherein said bale loading portion includes a fork member disposed adjacent one longitudinal edge of said frame section.

8. Bale handling apparatus according to claim 7 wherein said bale loading portion is disposed adjacent the longitudinal edge of said frame section opposite to the discharge of said bale rotating means.

9. Bale handling apparatus according to claim 7 wherein said fork member is pivotally connected to said frame section adjacent one longitudinal edge thereof.

10. Bale handling apparatus according to claim 9 wherein said fork member includes a transverse arm member with a pair of spaced cross members extending substantially perpendicular therefrom.

11. Bale handling apparatus according to claim 7 wherein said bale loading portion includes retractable supporting foot means.

12. Bale handling apparatus according to claim 9 wherein retractable supporting foot means is operatively connected to said fork member.

13. Bale handling apparatus according to claim 7 including bale ram means disposed adjacent said bale loading portion.

14. Bale handling apparatus according to claim 13 wherein said bale ram means includes a pivotally connected arm member with a contact section adjacent the free end thereof movable toward said rear rail section.

15. Bale handling apparatus according to claim 9 wherein said control portion includes means for pivoting said fork member.

16. Bale handling apparatus according to claim 14 wherein said control portion includes means for pivoting said pivotable arm member of said bale ram means.

17. Bale handling apparatus according to claim 1 wherein said control portion includes a plurality of hydraulic drive means.

* * * * *